US012783538B2

(12) United States Patent
Jain et al.

(10) Patent No.: US 12,783,538 B2
(45) Date of Patent: Nov. 3, 2026

(54) MACHINE LEARNING BASED SYSTEMS AND METHODS FOR EXTRACTING REMITTANCE DATA FROM PAYMENT NOTES

(71) Applicant: HIGHRADIUS CORPORATION, Houston, TX (US)

(72) Inventors: Vipul Jain, Hyderabad (IN); Debanwesh Bose, Hyderabad (IN); Sayantan Mondal, Hyderabad (IN); Pratyush Amrit, Hyderabad (IN); Lohit Vankina, Hyderabad (IN); Vamsi Ram Kiran Bharadwaj Gandepally, Hyderabad (IN); Aishwarya Kumar, Hyderabad (IN)

(73) Assignee: HIGHRADIUS CORPORATION

( * ) Notice: Subject to any disclaimer, the term of this patent is extended or adjusted under 35 U.S.C. 154(b) by 0 days.

(21) Appl. No.: 18/909,049

(22) Filed: Oct. 8, 2024

(65) Prior Publication Data

US 2026/0099505 A1 Apr. 9, 2026

(51) Int. Cl.
*G06F 16/25* (2019.01)
*G06F 16/28* (2019.01)
*G06N 20/00* (2019.01)

(52) U.S. Cl.
CPC .......... *G06F 16/254* (2019.01); *G06F 16/285* (2019.01); *G06N 20/00* (2019.01)

(58) Field of Classification Search
None
See application file for complete search history.

(56) References Cited

U.S. PATENT DOCUMENTS

2012/0330971 A1* 12/2012 Thomas ................. G06N 20/00 707/748
2016/0321499 A1* 11/2016 Meier .................. G06V 30/412
2020/0175559 A1* 6/2020 Saito ..................... G06F 16/221
2022/0036174 A1* 2/2022 Barra ..................... G06N 3/082
2023/0306768 A1* 9/2023 Cao ....................... G06F 18/214

* cited by examiner

*Primary Examiner* — Amresh Singh
(74) *Attorney, Agent, or Firm* — Jason C. Cameron

(57) ABSTRACT

A machine learning based (ML-based) computing method and system for extracting data associated with financial transactions from payment notes, is disclosed. Initially, the payment notes are received from databases. The data in the payment notes are identified based on knowledges and patterns, associated with the data in the payment notes, using a ML model. The identified data in the payment notes are classified based on at least one of: the knowledges and the patterns, using the ML model. The data are extracted from the payment notes upon classifying the data in the payment notes, using the ML model. The output of the data extracted from the payment notes, is provided to the users through user interfaces of electronic devices associated with the users.

17 Claims, 4 Drawing Sheets

MACHINE LEARNING BASED SYSTEMS AND METHODS FOR EXTRACTING REMITTANCE DATA FROM PAYMENT NOTES

FIELD OF INVENTION

Embodiments of the present disclosure relate to machine learning based (ML-based) computing systems, and more particularly relates to a ML-based computing method and system for extracting data (i.e., one or more remittance data) from one or more payment notes.

BACKGROUND

In financial operations, companies face crucial challenge of handling large volumes of daily payments and reconciling cash flows. This involves carefully matching of each payment with its corresponding invoice, and a process essential for maintaining accurate financial records and meeting audit standards. The matching task is further complicated by the need to analyze payment notes that are additional details provided by banks about individual payments or payment batches. These payment notes are vital for analysis, audit, and compliance, but the payment notes also present significant obstacles in terms of processing efficiency and accuracy.

The common method for handling the processing of the payment notes today involves large finance teams manually entering details from these payment notes into accounting systems. To support this time-consuming task, general-purpose regular expression (regex) tool is often used to help in identifying and extracting relevant information from the payment notes. This manual approach, combined with basic regex tools, is a typical practice for reconciling payments with outstanding invoices.

Despite the use of regex processing tool, the manual handling of payment notes is fraught with significant challenges. This approach is highly time-consuming, requiring extensive manpower to input data from a large number of notes into accounting systems. Additionally, the reliance on manual processes introduces a risk of human error, which may lead to inaccuracies in financial records and potentially compromise compliance with audit and regulatory standards. Furthermore, while the regex tool may be helpful, the regex tool often suffers from low accuracy, largely because the regex tool may not automatically adapt to new entity formats and lacks configurations for certain types of data. These shortcomings may result in inefficiencies and increase likelihood of errors, making the manual processing of payment notes even more problematic.

Hence, there is a need for an improved machine learning based (ML-based) computing system and method for extracting one or more remittance data from one or more payment notes, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for extracting data from one or more payment notes, is disclosed. The ML-based computing method comprises receiving, by one or more hardware processors, the one or more payment notes from one or more databases. The one or more payment notes comprise data associated with remittance in one or more financial transactions. The data comprise at least one of: one or more invoice numbers, one or more payment amounts, one or more account numbers of one or more users, payment date, information associated with one or more payment modes, and one or more metadata associated with the one or more payment note.

The ML-based computing method further comprises identifying, by the one or more hardware processors, the data in the one or more payment notes based on at least one of: one or more knowledges and one or more patterns, associated with the data in the one or more payment notes, using a machine learning (ML) model.

The ML-based computing method further comprises classifying, by the one or more hardware processors, the identified data in the one or more payment notes based on at least one of: the one or more knowledges and the one or more patterns, using the ML model.

The ML-based computing method further comprises extracting, by the one or more hardware processors, the data from the one or more payment notes upon classifying the data in the one or more payment notes, using the ML model.

The ML-based computing method further comprises providing, by the one or more hardware processors, an output of the data extracted from the one or more payment notes, to the one or more users through one or more user interfaces of one or more electronic devices associated with the one or more users.

In an embodiment, the machine-learning based (ML-based) computing method further comprises training the ML model for extracting the data from the one or more payment notes. Training of the ML model comprises: (a) obtaining, by the one or more hardware processors, one or more training datasets comprising historical data associated with one or more historical payment notes, from the one or more databases; (b) pre-processing, by the one or more hardware processors, the historical data to generate one or more accurate training datasets by removing at least one of: one or more delimiters and one or more characters, from the historical data; (c) annotating, by the one or more hardware processors, each of the historical data; (d) generating, by the one or more hardware processors, one or more configuration files with one or more hyperparameters of the ML model, for training the ML model, wherein the one or more hyperparameters comprise at least one of: a learn rate and drop out, wherein the learn rate is configured to optimize the ML model and to control a step size during gradient descent optimization, and wherein the dropout rate is configured for controlling percentage of neurons disabled during training for regularization; and (c) training, by the one or more hardware processors, the ML model using the one or more configuration files to identify at least one of: the one or more knowledges and the one or more patterns, associated with the data in the one or more payment notes, by analyzing the annotated historical data.

In another embodiment, the machine-learning based (ML-based) computing method further comprises post-processing, by the one or more hardware processors, the data extracted from the one or more payment notes. Post-processing the data comprises: (a) generating, by the one or more hardware processors, one or more confidence scores for the data extracted from the one or more payment notes; and (b) determining, by the one or more hardware processors, the data having at least one of: optimized precision and risk mitigation, in the one or more financial transactions, when the one or more confidence scores generated for the data exceed pre-determined threshold values.

In yet another embodiment, the machine-learning based (ML-based) computing method further comprises: (a) evaluating, by the one or more hardware processors, performance of the trained ML model using one or more metrics; and (b) adjusting, by the one or more hardware processors, the one or more hyperparameters for minimizing one or more false positive scores during training of the ML model.

In yet another embodiment, the machine-learning based (ML-based) computing method further comprises re-training, by the one or more hardware processors, the ML model upon analyzing changes on the one or more payment notes using by the data of the one or more payment notes extracted by the ML model.

In yet another embodiment, generating the one or more configuration files with the one or more hyperparameters of the ML model, for training the ML model, comprises: (a) setting, by the one or more hardware processors, the one or more hyperparameters to at least one of: a tokenizer and a named entity recognition (NER), wherein setting of the one or more hyperparameters to at least one of: the tokenizer and the NER, indicates that at least one of: the tokenizer and the NER need to be enabled for training the ML model; (b) setting, by the one or more hardware processors, one or more training corpus parameters to the one or more training datasets; and (c) setting, by the one or more hardware processors, the one or more hyperparameters comprising a language parameter to at least one language, wherein setting of the language parameter to at least one language, indicates that the ML model is trained for data in at least one language.

In yet another embodiment, the machine-learning based (ML-based) computing method further comprises assessing, by the one or more hardware processors, an accuracy of the extraction of the data on a header automation rate achieved using the data identified by the ML model, wherein the accuracy of the extraction of the data is configured for automation of the one or more financial transactions.

In one aspect, a machine learning based (ML-based) computing system for extracting data from one or more payment notes, is disclosed. The ML-based computing system includes one or more hardware processors and a memory coupled to the one or more hardware processors. The memory includes a plurality of subsystems in the form of programmable instructions executable by the one or more hardware processors.

The plurality of subsystems comprises a payment notes receiving subsystem configured to receive the one or more payment notes from one or more databases. The one or more payment notes comprise data associated with remittance in one or more financial transactions, wherein the data comprise at least one of: one or more invoice numbers, one or more payment amounts, one or more account numbers of one or more users, payment date, information associated with one or more payment modes, and one or more metadata associated with the one or more payment notes.

The plurality of subsystems further comprises a data identifying subsystem configured to identify the data in the one or more payment notes based on at least one of: one or more knowledges and one or more patterns, associated with the data in the one or more payment notes, using a machine learning (ML) model.

The plurality of subsystems further comprises a data classifying subsystem configured to classify the identified data in the one or more payment notes based on at least one of: the one or more knowledges and the one or more patterns, using the ML model.

The plurality of subsystems further comprises a data extracting subsystem configured to extract the data from the one or more payment notes upon classifying the data in the one or more payment notes, using the ML model.

The plurality of subsystems further comprises an output subsystem configured to provide an output of the data extracted from the one or more payment notes, to the one or more users through one or more user interfaces of one or more electronic devices associated with the one or more users.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
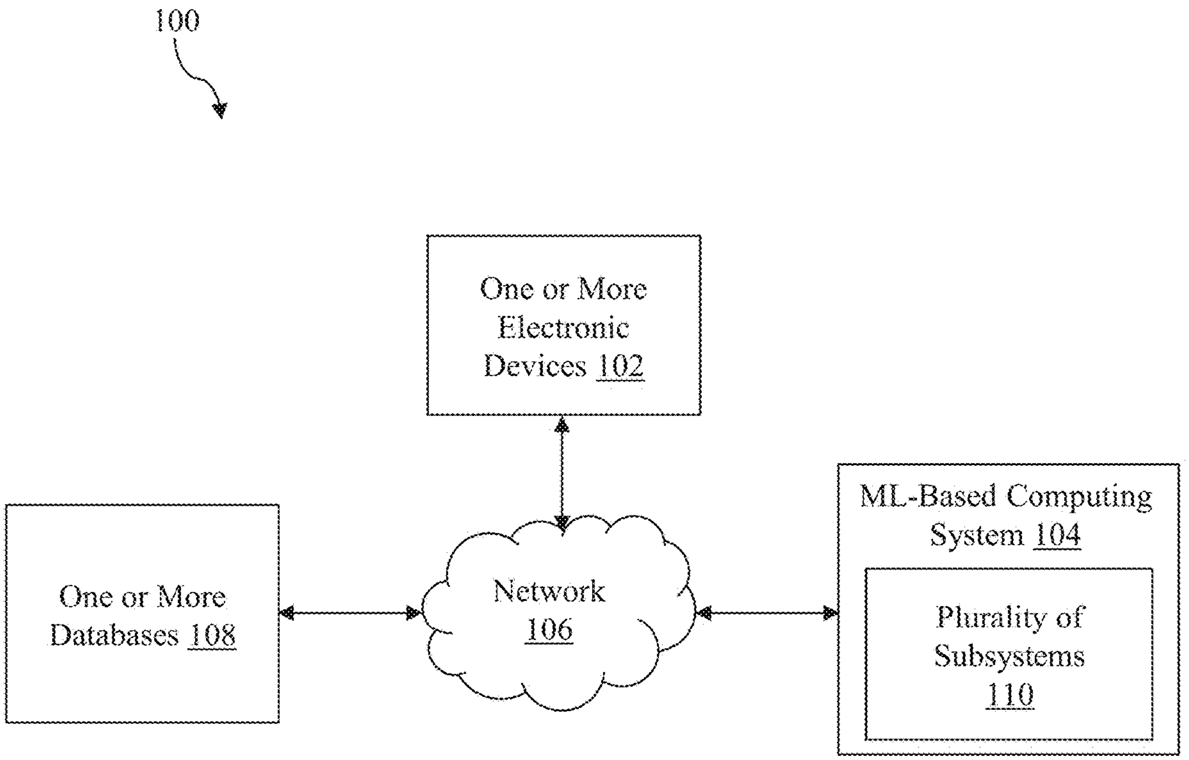
FIG. 1 is a block diagram illustrating a computing environment with a machine learning based (ML-based) computing system for extracting data (e.g., one or more remittance data) from one or more payment notes, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for extracting data i.e., remittance data from one or more payment notes, in accordance with an embodiment of the present disclosure. According to FIG. 1, the computing environment 100 includes one or more electronic devices 102 that are communicatively coupled to the ML-based computing system 104 through a network 106. The one or more electronic devices 102 through which one or more users provide one or more inputs to the ML-based computing system 104.

The present invention is configured to extract the remittance data from the one or more payment notes. The ML-based computing system 104 is initially configured to receive the one or more payment notes from one or more databases 108. In an embodiment, the one or more payment notes comprise the data associated with remittance in one or more financial transactions. More specifically the data comprise at least one of: one or more invoice numbers, one or more payment amounts, one or more account numbers of one or more users, payment date, information associated with one or more payment modes, one or more metadata associated with the one or more payment notes, and the like.

The ML-based computing system 104 is further configured to identify the data in the one or more payment notes based on at least one of: one or more knowledges and one or more patterns, associated with the data in the one or more payment notes, using a machine learning (ML) model.

The ML-based computing system 104 is further configured to classify the identified data in the one or more payment notes based on at least one of: the one or more knowledges and the one or more patterns, using the ML model. Here, the one or more knowledges comprise at least one of: one or more linguistic cues, one or more contextual information, and one or more structural elements, of the data in the one or more payment notes. Moreover, the one or more patterns comprise co-occurrences of words and common sentence structures around entities. Basically, the ML model learns all the common structural formats and how entities are usually presented within the one or more payment notes to understand the one or more patterns.

The ML-based computing system 104 is further configured to extract the data from the one or more payment notes upon classifying the data in the one or more payment notes, using the ML model. The ML-based computing system 104 is further configured to provide an output of the data extracted from the one or more payment notes, to the one or more users through one or more user interfaces of one or more electronic devices 102 associated with the one or more users.

In an embodiment, the one or more users may include at least one of: one or more data analysts, one or more business analysts, one or more cash analysts, one or more financial analysts, one or more collection analysts, one or more debt collectors, one or more professionals associated with cash and collection management, one or more customers, one or more organizations, one or more corporations, one or more parent companies, one or more subsidiaries, one or more joint ventures, one or more partnerships, one or more governmental bodies, one or more associations, and one or more legal entities, and the like.

The ML-based computing system 104 may be hosted on a central server including at least one of: a cloud server or a remote server. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the ML-based computing system 104 through the network 106. In an embodiment, the one or more databases 108 includes at least one of: one or more relational databases, one or more object-oriented databases, one or more data warehouses, one or more cloud-based databases, and the like. In another embodiment, a format of the data generated from the one or more databases 108 may include at least one of: a comma-separated values (CSV) format, a JavaScript Object Notation (JSON) format, an Extensible Markup Language (XML), spreadsheets, and the like.

Furthermore, the one or more electronic devices 102 include at least one of: a local browser, a mobile application, and the like. Furthermore, the second one or more users may use a web application through the local browser, the mobile application to communicate with the ML-based computing system 104. In an embodiment of the present disclosure, the ML-based computing system 104 includes a plurality of subsystems 110. Details on the plurality of subsystems 110 have been elaborated in subsequent paragraphs of the present description with reference to FIG. 2.

Figure 2:
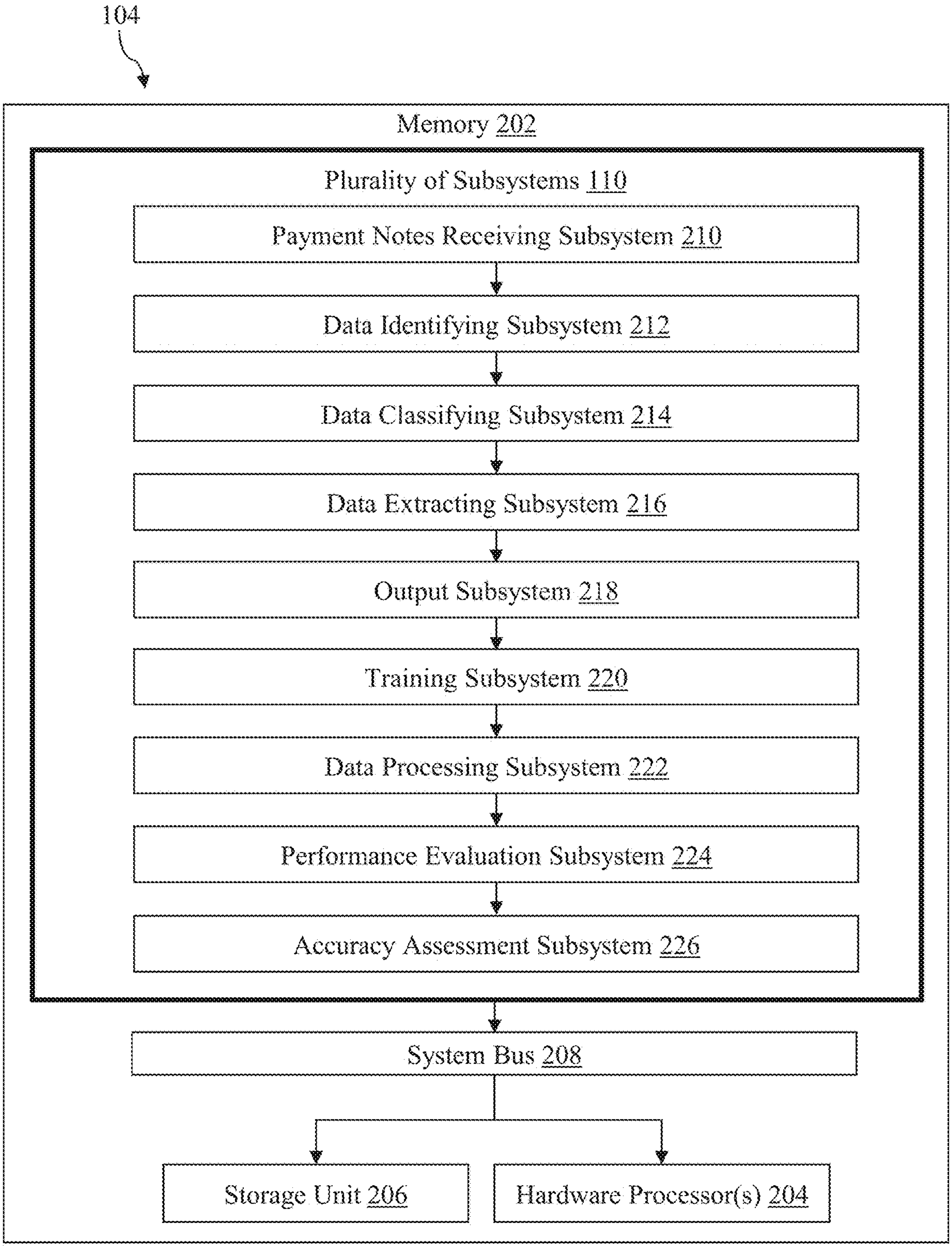
FIG. 2 is a detailed view of the ML-based computing system for extracting the data from the one or more payment notes, in accordance with another embodiment of the present disclosure.

FIG. 2 is a detailed view of the ML-based computing system 104 for extracting the data from the one or more payment notes, in accordance with another embodiment of the present disclosure. The ML-based computing system 104 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a payment notes receiving subsystem 210, a data identifying subsystem 212, a data classifying subsystem 214, a data extracting subsystem 216, an output subsystem 218, a training subsystem 220, a data processing subsystem 222, a performance evaluation subsystem 224, and an accuracy assessment subsystem 226. The brief details of the plurality of subsystems 110 have been elaborated in a below table.

| Plurality of Subsystems 110 | Functionality |
|---|---|
| Payment notes receiving subsystem 210 | The payment notes receiving subsystem 210 is configured to receive the one or more payment notes from the one or more databases 108. |
| Data identifying subsystem 212 | The data identifying subsystem 212 is configured to identify the data in the one or more payment notes based on at least one of: the one or more knowledges and the one or more patterns, associated with the data in the one or more payment notes using the machine learning (ML) model. |
| Data classifying subsystem 214 | The data classifying subsystem 214 is configured to classify the identified data in the one or more payment notes based on at least one of: the one or more knowledges and the one or more patterns, using the ML model. |
| Data extracting subsystem 216 | The data extracting subsystem 216 is configured to extract the data from the one or more payment notes upon classifying the data in the one or more payment notes, using the ML model. |
| Output subsystem 218 | The output subsystem 218 is configured to provide the output of the data extracted from the one or more payment notes to the one or more users through the one or more user interfaces of the one or more electronic devices 102 associated with the one or more users. |
| Training subsystem 220 | The training subsystem 220 is configured to train the ML model for extracting the data from the one or more payment notes. |
| Data processing subsystem 222 | The data processing subsystem 222 is configured to post-process the data extracted from the one or more payment notes. |
| Performance Evaluation subsystem 224 | The performance Evaluation subsystem 224 is configured to evaluate performance of the trained ML model using one or more metrics. |
| Accuracy assessment subsystem 226 | The accuracy assessment subsystem 226 is configured to assess an accuracy of the extraction of the data, on a header automation rate achieved using the data identified by the ML model. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the payment notes receiving subsystem 210 that is communicatively connected to the one or more hardware processors 204. The payment notes receiving subsystem 210 is configured to receive the one or more payment notes from the one or more databases 108. In an embodiment, the data are associated with the remittance in the one or more financial transactions. More specifically the data comprise at least one of: the one or more invoice numbers, the one or more payment amounts, the one or more account numbers of one or more users, the payment date, the information associated with one or more payment modes, and the one or more metadata associated with the one or more payment notes.

The plurality of subsystems 110 further includes the data identifying subsystem 212 that is communicatively connected to the one or more hardware processors 204. The data identifying subsystem 212 is configured to identify the data in the one or more payment notes based on at least one of: the one or more knowledges and the one or more patterns, associated with the data in the one or more payment notes, using the machine learning (ML) model. In an embodiment, the ML model may be a named entity recognition (NER) model configured to intelligently identify the data in the one or more payment notes based on at least one of: the one or more knowledges and the one or more patterns, associated with the data in the one or more payment notes. In an embodiment, using the information provided by the ML model, a final account receivables (AR) item is fetched on a product end.

The plurality of subsystems 110 further includes the data classifying subsystem 214 that is communicatively connected to the one or more hardware processors 204. The data classifying subsystem 214 is configured to classify the identified data in the one or more payment notes based on at least one of: the one or more knowledges and the one or more patterns, using the ML model. In an embodiment, the ML model may be the named entity recognition (NER) model configured to intelligently classify the data present in the one or more payment notes. In an embodiment, the one or more payment notes may be unstructured text in at least one of: a text format, an image format, and the like.

The plurality of subsystems 110 further includes the data extracting subsystem 216 that is communicatively connected to the one or more hardware processors 204. The data extracting subsystem 216 is configured to extract the data from the one or more payment notes upon classifying the data in the one or more payment notes, using the ML model.

The plurality of subsystems 110 further includes the data processing subsystem 222 that is communicatively connected to the one or more hardware processors 204. The data processing subsystem 222 is configured to post-process the data extracted from the one or more payment notes. For post-processing the data, the data processing subsystem 222 is configured to generate one or more confidence scores for the data extracted from the one or more payment notes. The data processing subsystem 222 is further configured to determine the data having at least one of: optimized precision and risk mitigation in the one or more financial transactions, when the one or more confidence scores generated for the data exceed pre-determined threshold values.

For example, every invoice number provided as an output by the ML model, is attached with the one or more confidence scores. The outputs with the invoice numbers are classified based on the one or more confidence scores to ensure high precision and risk mitigation. In an embodiment, one or more account receivables (AR) items determined using the values, are used differently in different scenarios by applications and tools, used in a field of AR management, accounting, and finance, to mitigate risks at the output. In an embodiment, the applications and tools may include cash application automation (CAA).

The plurality of subsystems 110 further includes the output subsystem 218 that is communicatively connected to the one or more hardware processors 204. The output subsystem 218 is configured to provide the output of the data extracted from the one or more payment notes to the one or more users through the one or more user interfaces of the one or more electronic devices 102 associated with the one or more users.

In other words, the output subsystem 218 is configured to receive payment level predictions that include one or more essential business fields extracted from the one or more payment notes. The payment level predictions may enable the ML-based computing system 104 to close a matching data (e.g., matching invoice) for the one or more financial transactions, which ensure accurate accounting and efficient financial processes.

The plurality of subsystems 110 further includes the training subsystem 220 that is communicatively connected to the one or more hardware processors 204. The training subsystem 220 is configured to train the ML model for extracting the data from the one or more payment notes. For training the ML model, the training subsystem 220 is initially configured to obtain one or more training datasets including historical data associated with one or more historical payment notes, from the one or more databases 108. In an embodiment, the historical data associated with the one or more historical payment notes are received/fetched from the one or more databases 108 by querying as a part of a training pipeline.

The training subsystem 220 is further configured to pre-process the historical data to generate one or more accurate training datasets by removing at least one of: one or more delimiters and one or more characters (e.g., one or more special characters), from the historical data. The one or more characters found in the one or more payment notes are not part of the prediction reference field. The pre-processing of the historical data may ensure a clean and accurate training datasets for further training process. In an embodiment, the removal of the one or more delimiters may be performed at the process of the data identification.

The training subsystem 220 is further configured to annotate each of the historical data. For annotating each historical data, the training subsystem 220 is initially configured to identify one or more tokens that generate an entity representing the data (i.e., the invoice number) in the one or more payment notes. The training subsystem 220 is further configured to generate a vocabulary for every payment note to annotate the payment note. In an embodiment, the actual note content needs to be stored in a text key within a dictionary.

For example, the annotation process of the one or more payment notes and annotated scripts are shown below.

REF TN ABCDEF INTERVAL INC. ACCT 101 INV 6594682 INVOICE

The annotation script for the annotation process of the one or more payment notes is shown below.

```
{
  "classes": [
    "INVOICE"
  ],
  "annotations": [
    {
      "0": "REF*IN*ABCDEF*INTERVAL INC. ACCT 101 #INV
6594682"
    },
    {
      "entities": [
        {
          "0": 42,
          "1": 49,
          "2": "INVOICE"
        }
      ]
    }
  ]
}
```

In an example, the input for the identification of the data in the one or more payment notes is as follows.

```
{
  "primaryKey": 1245,
  "accountId": 75,
  "maxThreshold": 50,
  "paymentInfo": [
    {
      "paymentNote": "REF*TN*ABCDEF*INTERVAL INC. ACCT
101 #INV 6594682",
      "bankId": "12",
      "paymentPoolId": "750",
      "companyCode": "UK"
    }
  ]
}
```

The data identifying subsystem 212 is configured to identify the data (e.g., an invoice number) as shown below.

REF TN ABCDEF INTERVAL INC. ACCT 101 INV 6594682 INVOICE

The output from the above given payment note is (6594682, INVOICE, 0.98).

The below given scripts enable the data processing subsystem 222 to process the data in the one or more payment notes.

```
{
  "Response": {
    "status": "SUCCESS",
    "code": "200",
    "message": "All are processed",
    "output": [
      {
        "primaryKey": "1245",
        "predictions": [
          {
            "itemInfo": [
              {
                "reference_field": "6594682",
                "confidence_score": "0.98"
              }
            ]
          }
        ],
        "processingTimeInfo": {
          "totalPipelineExecutionTime": "15",
          "errorMessage": ""
        }
      }
    ]
  }
}
```

The training subsystem 220 is further configured to include a list of dictionaries in the annotations key. Every dictionary in the list denotes a named entity that may be located in the one or more payment notes and includes details about the named entity, including its type and start and end locations. Once the annotation process is complete, the training subsystem 220 is configured to convert the annotated data into spaCy's binary format. This binary format is the preferred format for training spaCy's machine learning models.

The training subsystem 220 is configured to generate one or more configuration files with one or more hyperparameters of the ML model, for training the ML model. In an embodiment, the one or more hyperparameters comprise at least one of: a learn rate, drop out, and the like. In an embodiment, the learn rate is configured to optimize the ML model and control a step size during gradient descent optimization. The learn rate controls the step size for training the ML model and for determining a speed at which ML model parameters change to perform the best. In another embodiment, the drop out rate is configured for controlling percentage of neurons disabled during training for regularization.

The one or more hyperparameters for training the ML model are shown below.

```
[paths]
train = <training_data_path>
dev = <validation_data_path>
vectors = "en_core_web_lg"
[system]
gpu_allocator = null
seed = 42
[nlp]
lang = "en"
pipeline = ["tok2vec","ner"]
batch_size = 1000
tokenizer = {"@tokenizers":"spacy.Tokenizer.v1"}
[components.ner]
factory = "ner"
scorer = {"@scorers":"spacy.ner_scorer.v1"}
update_with_oracle_cut_size = 100
[components.ner.model]
@architectures = "spacy.TransitionBasedParser.v2"
state_type = "ner"
hidden_width = 64
[components.ner.model.tok2vec]
@architectures = "spacy.Tok2VecListener.v1"
[components.tok2vec]
factory = "tok2vec"
components.tok2vec.model]
@architectures = "spacy.Tok2Vec.v2"
[training]
dev_corpus = "corpora.dev"
train_corpus = "corpora.train"
dropout = 0.1
accumulate_gradient = 1
patience = 1600
max_steps = 20000
eval_frequency = 200
[training.batcher]
@batchers = "spacy.batch_by_words.v1"
discard_oversize = false
tolerance = 0.2
get_length = null
[training.batcher.size]
@schedules = "compounding.v1"
start = 100
stop = 1000
compound = 1.001
t = 0.0
[training.optimizer]
@optimizers = "Adam.v1"
beta1 = 0.9
```

For generating the one or more configuration files with the one or more hyperparameters of the ML model, the training subsystem 220 is configured to apply the one or more hyperparameters at a named entity recognition (NER) level. In an embodiment, tokenization, using a tokenizer, is to represent the text in a manner that is meaningful for machines without losing its context. In an embodiment, setting of the one or more hyperparameters to at least one of: the tokenizer and the NER, indicates that at least one of: the tokenizer and the NER need to be enabled for training the ML model.

The training subsystem 220 is further configured to set one or more training corpus parameters to the one or more training datasets. The training subsystem 220 is further configured to set the one or more hyperparameters comprising a language parameter to at least one language. In an embodiment, setting of the language parameter to at least one language, indicates that the ML model is trained for data in at least one language. In other words, the natural language processing (NLP) model specifies the language of the ML model. The language parameter is set to “en” indicating that the model is trained for English language data.

The training subsystem 220 is further configured to train the ML model using the one or more configuration files to identify at least one of: the one or more knowledges and the one or more patterns, associated with the data in the one or more payment notes, by analyzing the annotated historical data. In an embodiment, the training subsystem 220 is configured to re-train the ML model upon analyzing changes on the one or more payment notes by the data of the one or more payment notes extracted by the ML model. In other words, any user input/intervention on the one or more payment notes using one or more business attributes extracted by the ML model is considered for retraining.

The plurality of subsystems 110 further includes the performance evaluation subsystem 224 that is communicatively connected to the one or more hardware processors 204. The performance evaluation subsystem 224 is configured to evaluate the performance of the trained ML model using one or more metrics. The performance evaluation subsystem 224 is configured to adjust the one or more hyperparameters for minimizing one or more false positive scores during training of the ML model. In other words, the performance evaluation subsystem 224 is configured to prioritize precision as the metric, to optimize automation and minimize false positives in a custom NER model. The performance evaluation subsystem 224 is configured to achieve a lower false positive score during training of the ML model to ensure accurate entity recognition and reliable results.

The plurality of subsystems 110 further includes the accuracy assessment subsystem 226 that is communicatively connected to the one or more hardware processors 204. The accuracy assessment subsystem 226 is configured to assess an accuracy of the extraction of the data, on a header automation rate achieved using the data identified by the ML model. In an embodiment, the accuracy of the extraction of the data, is configured for automation of the one or more financial transactions. In other words, the remittances are fully automated with the help of predicted business fields (i.e., every data item captured without user intervention is considered a success for the ML model). In an embodiment, the percentage volume of such payments with respect to total payments in the ML-based computing system 104, may become a final business value metric.

In an embodiment of the present disclosure, the automated training, re-training, and prediction pipeline for the ML model is integrated with ML platform or Artificial Intelligence (AI) platform for instant consumption by any enterprise. In an embodiment, the ML platform or AI platform may be configured in every cloud service provider in user by the ML-based computing system 104 as the ML-based computing system 104 is a cloud agnostic, and making the solution fully scalable.

Figure 3:
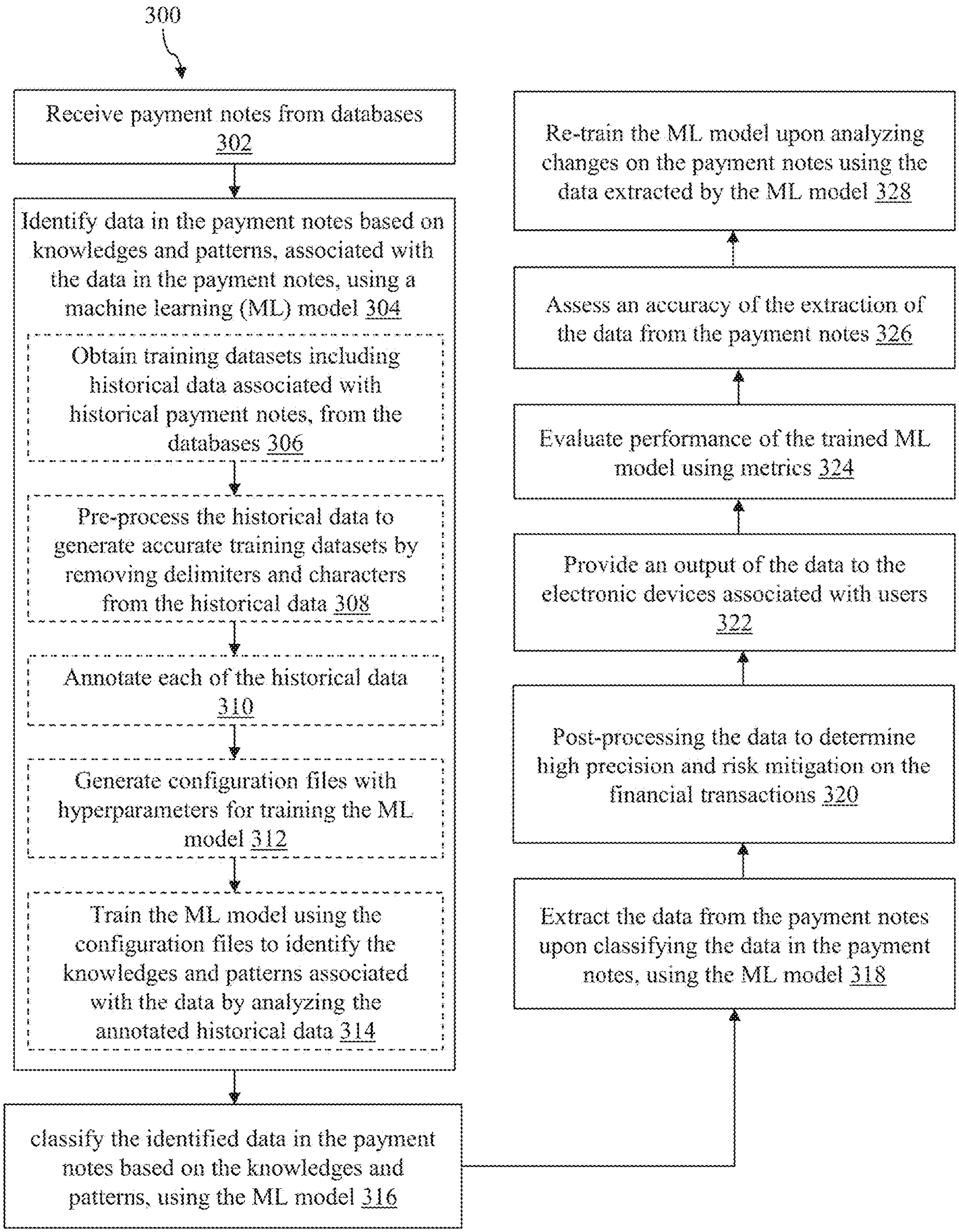
FIG. 3 is an overall process flow of extracting the data from the one or more payment notes, in accordance with another embodiment of the present disclosure.

FIG. 3 is an overall process flow 300 of extracting the data from the one or more payment notes, in accordance with another embodiment of the present disclosure. At step 302, the one or more payment notes are received from the one or more databases 108. At step 304, the data in the one or more payment notes, are identified based on the at least one of: the one or more knowledges and the one or more patterns, associated with the data in the one or more payment notes using the machine learning (ML) model.

For identifying the data, the ML model is being trained. For training the ML model, the one or more training datasets including historical data associated with one or more historical payment notes, are obtained from the one or more databases 108, as shown in step 306. The historical data are pre-processed to generate the one or more accurate datasets by removing the one or more delimiters and the one or more characters, from the historical data, as shown in step 308. Each of the historical data is annotated, in the one or more payment notes, as shown in step 310.

The one or more configuration files are generated with the one or more hyperparameters of the ML model, for training the ML model, as shown in step 312. The ML model is trained using the one or more configuration files to identify at least one of: the one or more knowledges and the one or more patterns, associated with the data in the one or more payment notes, by analyzing the annotated historical data in the one or more historical payment notes, as shown in step 314.

At step 316, the identified data in the one or more payment notes are classified based on at least one of: the one or more knowledges and the one or more patterns, using the ML model.

At step 318, the data are extracted from the one or more payment notes upon classifying the data in the one or more payment notes, using the ML model.

At step 320, the extracted data are post-processed to determine that the data having at least one of: optimized precision and risk mitigation in the one or more financial transactions, when the one or more confidence scores generated for the data exceed pre-determined threshold values. At step 322, the output of the data extracted from the one or more payment notes, is provided to the one or more users through the one or more user interfaces of the one or more electronic devices 102 associated with the one or more users.

At step 324, the performance of the trained ML model is evaluated using the one or more metrics. At step 326, the accuracy of the extraction of the data, is assessed on a header automation rate achieved using the data identified by the ML model. At step 328, the ML model is re-trained upon analyzing changes on the one or more payment notes by the data of the one or more payment notes extracted by the ML model.

Figure 4:
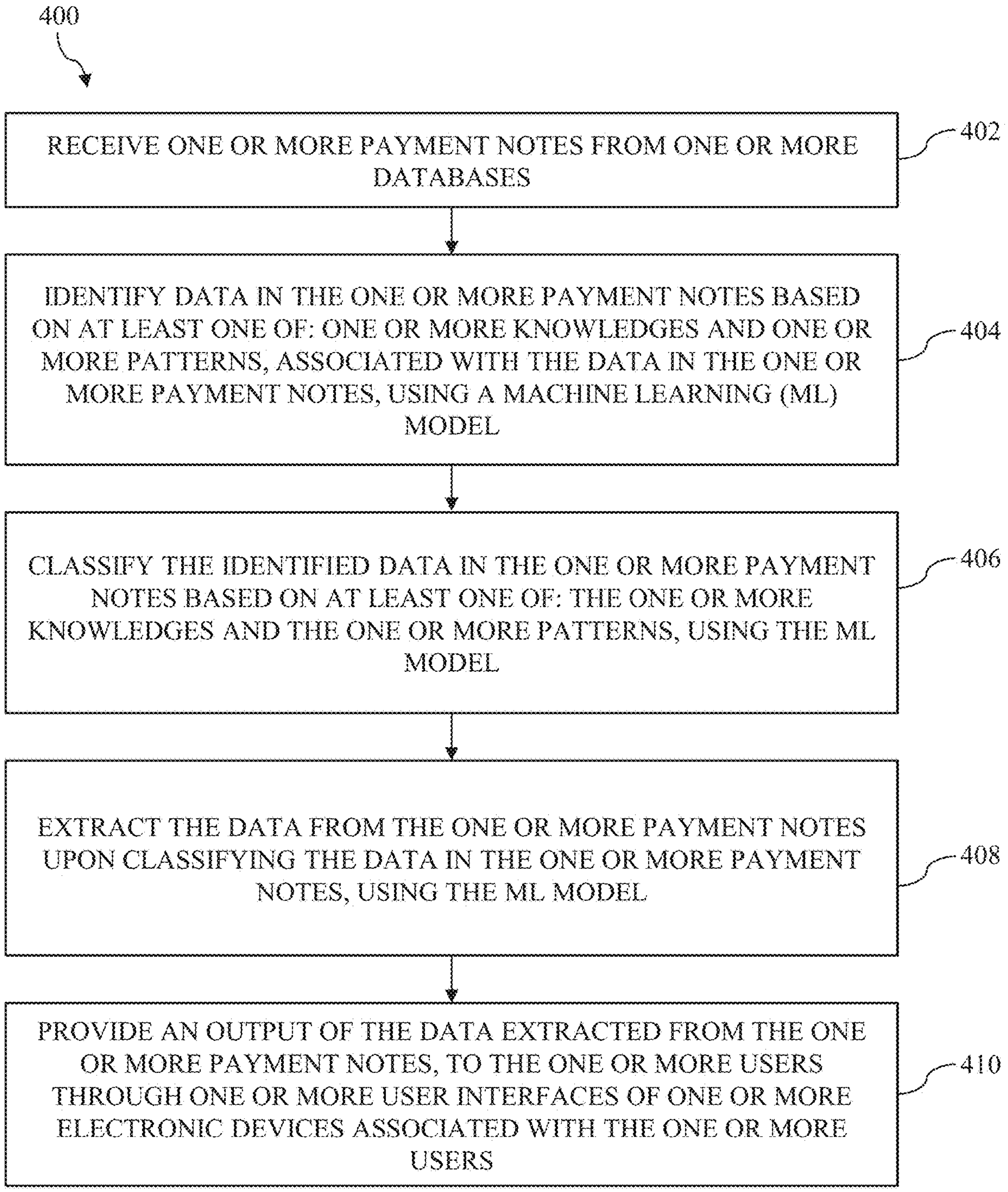
FIG. 4 is a flow chart illustrating a machine-learning based (ML-based) computing method for extracting the data (e.g., the one or more remittance data) from the one or more payment notes, in accordance with an embodiment of the present disclosure.

FIG. 4 is a flow chart illustrating a machine-learning based (ML-based) computing method 400 for extracting the data i.e., the remittance data, from the one or more payment notes, in accordance with an embodiment of the present disclosure. At step 402, the one or more payment notes are received from the one or more databases 108. In an embodiment, the data are associated with the remittance in the one or more financial transaction, wherein the data comprise at least one of: the one or more invoice numbers, the one or more payment amounts, the one or more account numbers of one or more users, the payment date, the information associated with the one or more payment modes, and the one or more metadata associated with the one or more payment notes.

At step 404, the data in the one or more payment notes are identified based on at least one of: the one or more knowledges and the one or more patterns, associated with the data in the one or more payment notes, using the machine learning (ML) model.

At step 406, the identified data in the one or more payment notes are classified based on at least one of: the one or more knowledges and the one or more patterns, using the ML model.

At step 408, the data are extracted from the one or more payment notes upon classifying the data in the one or more payment notes, using the ML model. At step 410, the output of the data extracted from the one or more payment notes, is provided to the one or more users through the one or more user interfaces of the one or more electronic devices 102 associated with the one or more users.

The present invention has the following advantages. The present invention with the ML-based computing system 104 is configured to extract the data i.e., the one or more remittance data, from the one or more payment notes. The ML-based computing system 104 and the ML-based computing method 600 enhance efficiency and accuracy in extracting the remittance data from the one or more payment notes. The present invention enables the ML-based computing system 104 to make the financial transactions ensuring accurate accounting and efficient financial processes.

Further, the present invention is configured to fully automate the remittances with the help of predicted/extracted business fields (i.e., every data item identified/captured without user intervention is considered a success for the ML model).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based computing system 104 either directly or through intervening I/O controllers. Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU). The CPUs are interconnected via the system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words “comprising,” “having,” “containing,” and “including,” and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms “a,” “an,” and “the” include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for extracting data from one or more payment notes, the ML-based computing method comprising:

receiving, by one or more hardware processors, the one or more payment notes from one or more databases, wherein the one or more payment notes comprise the data associated with remittance in one or more financial transactions, wherein the data comprise at least one of: one or more invoice numbers, one or more payment amounts, one or more account numbers of one or more users, payment date, information associated with one or more payment modes, and one or more metadata associated with the one or more payment notes;

identifying, by the one or more hardware processors, the data in the one or more payment notes based on at least one of: one or more knowledges and one or more patterns, associated with the data in the one or more payment notes, using a machine learning (ML) model;

classifying, by the one or more hardware processors, the identified data in the one or more payment notes based on at least one of: the one or more knowledges and the one or more patterns, using the ML model;

extracting, by the one or more hardware processors, the data from the one or more payment notes upon classifying the data in the one or more payment notes, using the ML model;

providing, by the one or more hardware processors, an output of the data extracted from the one or more payment notes to the one or more users through one or more user interfaces of one or more electronic devices associated with the one or more users;

training, by the one or more hardware processors, the machine learning (ML) model for extracting the data from the one or more payment notes, wherein training the ML model comprises annotating historical data associated with one or more historical payment notes, wherein annotating the historical data comprises generating a unique vocabulary dictionary for every individual historical payment note, wherein actual note content of the individual historical payment note is stored in a text key within the unique vocabulary dictionary corresponding to said individual historical payment note; and assessing, by the one or more hardware processors, an accuracy of the data extracted based on a header automation rate achieved using the data extracted, wherein the accuracy of the data extraction is configured for automation of the one or more financial transactions, and wherein the header automation rate corresponds to a percentage volume of the one or more financial transactions where every data item in the one or more payment notes is extracted by the ML model without intervention of the one or more users.

2. The machine-learning based (ML-based) computing method of claim 1, wherein training the ML model comprises:

obtaining, by the one or more hardware processors, one or more training datasets comprising the historical data from the one or more databases;

pre-processing, by the one or more hardware processors, the historical data to generate one or more accurate training datasets by removing at least one of: one or more delimiters and one or more characters, from the historical data;

generating, by the one or more hardware processors, one or more configuration files with one or more hyperparameters of the ML model, for training the ML model, wherein the one or more hyperparameters comprise at least one of: a learn rate and drop out, wherein the learn rate is configured to optimize the ML model and control a step size during gradient descent optimization, and wherein the dropout rate is configured for controlling percentage of neurons disabled during training for regularization; and training, by the one or more hardware processors, the ML model using the one or more configuration files to identify at least one of: the one or more knowledges and the one or more patterns, associated with the data in the one or more payment notes, by analyzing the annotated historical data.

3. The machine-learning based (ML-based) computing method of claim 2, further comprising:

evaluating, by the one or more hardware processors, performance of the trained ML model using one or more metrics; and adjusting, by the one or more hardware processors, the one or more hyperparameters for minimizing one or more false positive scores during training of the ML model.

4. The machine-learning based (ML-based) computing method of claim 2, further comprising re-training, by the one or more hardware processors, the ML model upon analyzing changes on the one or more payment notes using the data of the one or more payment notes extracted by the ML model.

5. The machine-learning based (ML-based) computing method of claim 2, wherein generating the one or more configuration files with the one or more hyperparameters of the ML model, for training the ML model, comprises:

setting, by the one or more hardware processors, the one or more hyperparameters to at least one of: a tokenizer and a named entity recognition (NER), wherein setting of the one or more hyperparameters to at least one of: the tokenizer and the NER, indicates that at least one of: the tokenizer and the NER need to be enabled for training the ML model;

setting, by the one or more hardware processors, one or more training corpus parameters to the one or more training datasets; and setting, by the one or more hardware processors, the one or more hyperparameters comprising a language parameter to at least one language, wherein setting of the language parameter to at least one language, indicates that the ML model is trained for data in at least one language.

6. The machine-learning based (ML-based) computing method of claim 1, further comprising post-processing, by the one or more hardware processors, the data extracted from the one or more payment notes, wherein post-processing the data comprises:

generating, by the one or more hardware processors, one or more confidence scores for the data extracted from the one or more payment notes; and determining, by the one or more hardware processors, the data having at least one of: optimized precision and risk mitigation in the one or more financial transactions, when the one or more confidence scores generated for the data exceed pre-determined threshold values.

7. A machine learning based (ML-based) computing system for extracting data from one or more payment notes, the ML-based computing system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a payment notes receiving subsystem configured to receive the one or more payment notes from one or more databases, wherein the one or more payment notes comprise the data associated with remittance in one or more financial transactions, wherein the data comprise at least one of: one or more invoice numbers, one or more payment amounts, one or more account numbers of one or more users, payment date, information associated with one or more payment modes, and one or more metadata associated with the one or more payment notes;

a data identifying subsystem configured to identify the data in the one or more payment notes based on at least one of: one or more knowledges and one or more patterns, associated with the data in the one or more payment notes, using a machine learning (ML) model;

a data classifying subsystem configured to classify the identified data in the one or more payment notes based on at least one of: the one or more knowledges and the one or more patterns, using the ML model;

a data extracting subsystem configured to extract the data from the one or more payment notes upon classifying the data in the one or more payment notes, using the ML model;

an output subsystem configured to provide an output of the data extracted from the one or more payment notes to the one or more users through one or more user interfaces of one or more electronic devices associated with the one or more users;

a training subsystem configured to train the machine learning (ML) model for extracting the data from the one or more payment notes, wherein in training the machine learning model, the training subsystem is configured to annotate historical data associated with one or more historical payment notes, wherein annotating the historical data comprises generating a unique vocabulary dictionary for every individual historical payment note, wherein actual note content of the individual historical payment note is stored in a text key within the unique vocabulary dictionary corresponding to said individual historical payment note; and an accuracy assessment subsystem configured to assess an accuracy of the data extracted based on a header automation rate achieved using the data extracted, wherein the accuracy of the data extraction is configured for automation of the one or more financial transactions, and wherein the header automation rate corresponds to a percentage volume of the one or more financial transactions where every data item in the one or more payment notes is extracted by the ML model without intervention of the one or more users.

8. The machine-learning based (ML-based) computing system of claim 7, wherein in training the ML model, the training subsystem is configured to:

obtain one or more training datasets comprising the historical data from the one or more databases;

pre-process the historical data to generate one or more accurate training datasets by removing at least one of: one or more delimiters and one or more characters, from the historical data;

generate one or more configuration files with one or more hyperparameters of the ML model, for training the ML model, wherein the one or more hyperparameters comprise at least one of: a learn rate and drop out, wherein the learn rate is configured to optimize the ML model and control a step size during gradient descent optimization, and wherein the dropout rate is configured for controlling percentage of neurons disabled during training for regularization; and train the ML model using the one or more configuration files to identify at least one of: the one or more knowledges and the one or more patterns, associated with the data in the one or more payment notes, by analyzing the annotated historical data.

9. The machine-learning based (ML-based) computing system of claim 8, further comprising a performance evaluation subsystem configured to:

evaluate performance of the trained ML model using one or more metrics; and adjust the one or more hyperparameters for minimizing one or more false positive scores during training of the ML model.

10. The machine-learning based (ML-based) computing system of claim 8, wherein the training subsystem is further configured to re-train the ML model upon analyzing changes on the one or more payment notes using the data of the one or more payment notes extracted by the ML model.

11. The machine-learning based (ML-based) computing system of claim 8, wherein in generating the one or more configuration files with the one or more hyperparameters of the ML model, the training subsystem is configured to:

set the one or more hyperparameters to at least one of: a tokenizer and a named entity recognition (NER), wherein setting of the one or more hyperparameters to at least one of: the tokenizer and the NER, indicates that at least one of: the tokenizer and the NER need to be enabled for training the ML model;

set one or more training corpus parameters to the one or more training datasets; and set the one or more hyperparameters comprising a language parameter to at least one language, wherein setting of the language parameter to at least one language, indicates that the ML model is trained for data in at least one language.

12. The machine-learning based (ML-based) computing system of claim 7, further comprising a data processing subsystem configured to post-process the data extracted from the one or more payment notes, wherein in post-processing the data, the data processing subsystem is configured to:

generate one or more confidence scores for the data extracted from the one or more payment notes; and determine the data having at least one of: optimized precision and risk mitigation in the one or more financial transactions, when the one or more confidence scores generated for the data exceed pre-determined threshold values.

13. A non-transitory computer-readable storage medium having instructions stored therein that when executed by a hardware processor, cause the processor to execute operations of:

receiving the one or more payment notes from one or more databases, wherein the one or more payment notes comprise data associated with remittance in one or more financial transactions, wherein the data comprise at least one of: one or more invoice numbers, one or more payment amounts, one or more account numbers of one or more users, payment date, information associated with one or more payment modes, and one or more metadata associated with the one or more payment notes;

identifying the data in the one or more payment notes based on at least one of: one or more knowledges and one or more patterns, associated with the data in the one or more payment notes using a machine learning (ML) model;

classifying the identified data in the one or more payment notes based on at least one of: the one or more knowledges and the one or more patterns, using the ML model;

extracting the data from the one or more payment notes upon classifying the data in the one or more payment notes, using the ML model;

providing an output of the data extracted from the one or more payment notes to the one or more users through one or more user interfaces of one or more electronic devices associated with the one or more users;

training a machine learning (ML) model for extracting the data from the one or more payment notes, wherein training the ML model comprises annotating historical data associated with one or more historical payment notes, wherein annotating the historical data comprises generating a unique vocabulary dictionary for every individual historical payment note, wherein actual note content of the individual historical payment note is stored in a text key within the unique vocabulary dictionary corresponding to said individual historical payment note; and assessing an accuracy of the data extracted based on a header automation rate achieved using the data extracted, wherein the accuracy of the data extraction is configured for automation of the one or more financial transactions, and wherein the header automation rate corresponds to a percentage volume of the one or more financial transactions where every data item in the one or more payment notes is extracted by the ML model without intervention of the one or more users.

14. The non-transitory computer-readable storage medium of claim 13, wherein training the ML model comprises:

obtaining one or more training datasets comprising the historical data from the one or more databases;

pre-processing the historical data to generate one or more accurate training datasets by removing at least one of: one or more delimiters and one or more characters, from the historical data;

generating one or more configuration files with one or more hyperparameters of the ML model, for training the ML model, wherein the one or more hyperparameters comprise at least one of: a learn rate and drop out, wherein the learn rate is configured to optimize the ML model and control a step size during gradient descent optimization, and wherein the dropout rate is configured for controlling percentage of neurons disabled during training for regularization; and training the ML model using the one or more configuration files to identify at least one of: the one or more knowledges and the one or more patterns, associated with the data in the one or more payment notes, by analyzing the annotated historical data.

15. The non-transitory computer-readable storage medium of claim 14, further comprising:

evaluating performance of the trained ML model using one or more metrics; and adjusting the one or more hyperparameters for minimizing one or more false positive scores during training of the ML model.

16. The non-transitory computer-readable storage medium of claim 14, wherein generating the one or more configuration files with the one or more hyperparameters of the ML model, for training the ML model, comprises:

setting the one or more hyperparameters to at least one of: a tokenizer and a named entity recognition (NER), wherein setting of the one or more hyperparameters to at least one of: the tokenizer and the NER, indicates that at least one of: the tokenizer and the NER need to be enabled for training the ML model;

setting one or more training corpus parameters of the one or more training datasets; and setting the one or more hyperparameters comprising a language parameter to at least one language, wherein setting of the language parameter to at least one language, indicates that the ML model is trained for data in at least one language.

17. The non-transitory computer-readable storage medium of claim 13 further comprising post-processing the data extracted from the one or more payment notes, wherein post-processing the data comprises:

generating one or more confidence scores for the data extracted from the one or more payment notes; and determining the data having at least one of: optimized precision and risk mitigation in the one or more financial transactions, when the one or more confidence scores generated for the data exceed pre-determined threshold values.

* * * * *